United States Patent
McAree et al.

(10) Patent No.: US 8,515,708 B2
(45) Date of Patent: Aug. 20, 2013

(54) METHOD FOR POSITION-CALIBRATION OF A DIGGING ASSEMBLY FOR ELECTRIC MINING SHOVELS

(75) Inventors: Peter Ross McAree, St Lucia (AU); Anthony Walton Reid, Auchenflower (AU); Kevin John Austin, Newstead (AU); Paul Martin Siegrist, West End (AU)

(73) Assignee: CMTE Developement Limited, Pinjarra Hills (AU)

( * ) Notice: Subject to any disclaimer, the term of this patent is extended or adjusted under 35 U.S.C. 154(b) by 316 days.

(21) Appl. No.: 12/935,529

(22) PCT Filed: Mar. 31, 2009

(86) PCT No.: PCT/AU2009/000384
§ 371 (c)(1),
(2), (4) Date: Sep. 29, 2010

(87) PCT Pub. No.: WO2009/121122
PCT Pub. Date: Oct. 8, 2009

(65) Prior Publication Data
US 2011/0029279 A1    Feb. 3, 2011

(30) Foreign Application Priority Data
Apr. 1, 2008   (AU) .............................. 2008901560

(51) Int. Cl.
*G01C 17/00* (2006.01)

(52) U.S. Cl.
USPC ........................................... 702/150; 701/50

(58) Field of Classification Search
USPC ............................................ 702/150; 701/50
See application file for complete search history.

(56) References Cited

U.S. PATENT DOCUMENTS

| | | | |
|---|---|---|---|
| 5,848,485 A | 12/1998 | Anderson et al. | |
| 6,108,076 A | 8/2000 | Hanseder | |
| 6,225,574 B1 * | 5/2001 | Chang et al. | 177/139 |
| 7,079,931 B2 | 7/2006 | Sahm et al. | |

FOREIGN PATENT DOCUMENTS

| | | |
|---|---|---|
| WO | WO-93/05479 | 3/1993 |
| WO | WO2008/091395 | 7/2008 |

OTHER PUBLICATIONS

International Search Report for International Application No. PCT/AU2009/000384, Applicant: CMTE Development Limited et al., mailing date Jun. 29, 2009, 4 pages.

Wauge, D., "Payload Estimation for Electric Mining Shovels," School of Engineering, The University of Queensland, PhD Thesis, Australia, 2007, 246 pages.

* cited by examiner

*Primary Examiner* — Sujoy Kundu
(74) *Attorney, Agent, or Firm* — Perkins Coie LLP

(57) ABSTRACT

The present invention relates generally to the field of positioning mechanical equipment, and particularly to the likes of mechanical excavation and electric mining shovels. In one embodiment, there is disclosed a system for calibrating the sensors that measure hoist and crowd motions for an electric mining shovel, enabling the position of a bucket to be known with greater accuracy than can be achieved using previously known approaches.

10 Claims, 5 Drawing Sheets

METHOD FOR POSITION-CALIBRATION OF A DIGGING ASSEMBLY FOR ELECTRIC MINING SHOVELS

CROSS REFERENCE TO RELATED APPLICATION

This application is a U.S. National Phase application of International Application Serial No. PCT/AU2009/000384, filed on Mar. 31, 2009, entitled A METHOD FOR POSITION-CALIBRATION OF A DIGGING ASSEMBLY FOR ELECTRIC MINING SHOVELS, which claims priority to Australian Patent Application No. 2008901560, filed on Apr. 1, 2008, which are incorporated by reference.

FIELD OF THE INVENTION

The present invention relates generally to the field of positioning mechanical equipment, and particularly to the likes of mechanical excavation and electric mining shovels. In one embodiment, there is disclosed a system for calibrating the sensors that measure hoist and crowd motions for an electric mining shovel, enabling the position of a bucket to be known with greater accuracy than can be achieved using previously known approaches. However, it will be appreciated that the invention is not limited to this particular field of use.

BACKGROUND OF THE PRESENT INVENTION

Any discussion of the prior art throughout the specification should in no way be considered as an admission that such prior art is widely known or forms part of common general knowledge in the field.

Electric mining shovels are commonly used in open-pit mining. Accurate knowledge of the spatial position of such a machine's bucket (or dipper) is important, and finds application in several operational contexts. Examples include:
Control strategies for avoiding collisions between the bucket and obstacles, including self-collisions.
Monitoring technologies, such payload weighing systems and ore grade monitoring tools.

Accurate determination of bucket position requires calibration of the sensors used to measure swing, crowd and hoist motions. In practice, these sensors are typically angular position sensors (e.g. rotary resolvers) attached to actuators (e.g. electric motors) of the machine's motion axes.

The bucket position can be established by using these sensor readings in conjunction with a so-called forward kinematic map that relates the positions of the motors to the positions of the bucket. Calibration amounts to determining offsets for each resolver. When these offsets are added to the measured sensor values, they accurately establish actual bucket position through the forward kinematic map.

Calibration of the swing resolver can be realized using a secondary device that indicates when the swing axis is at zero position. Such devices can be readily constructed by people skilled in the field. The hoist and crowd motions are normally coupled and a more sophisticated approach is needed.

The control systems of modern mining shovels provide procedures for calibrating hoist and crowd resolver offsets. These procedures require that the operator position the bucket at a sequence of specified locations. The process relies on operator judgement and in practice the determination of offsets using these methods is inaccurate and imprecise. Recalibration must be performed at frequent intervals, for example when the bucket or the hoist ropes are changed.

Wauge (see Wauge, D. 2007. *Payload Estimation for Electric Mining Shovels*, PhD Thesis, The University of Queensland, Australia) describes a multi-point photometric method to calibrate the offsets of the hoist and crowd resolvers. This technique generates accurate calibration results, but is labour intensive and not appropriate in a production environment.

SUMMARY OF THE PRESENT INVENTION

It is an object of the present invention to overcome or ameliorate at least one of the disadvantages of the prior art, or to provide a useful alternative. It is an object of the present invention, at least according to some embodiments, to provide an improved method for position calibration of a digging assembly for electric mining shovels.

In accordance with a first aspect of the present invention, there is provided a method of calibrating a work implement location, the work implement being attached to a machine house, the method comprising the steps of: (a) defining a h-frame comprising a set of Cartesian coordinate axes fixed to the machine house with the (X, Z) plane being in the sagittal plane of the machine house and the Y-axis being orthogonal; (b) utilising a range measurement sensor at a point $p_h=(x_h,z_h)$ in the h-frame to create a directed line of measurement in the $(X_h,Z_h)$-plane of the h-frame originating at $p_h$ along which a range measurement is made, designated by angle $\theta_h$; (c) defining a d-frame comprising a set of Cartesian coordinate axes fixed to the work implement; (d) providing a range measurement sensor target at a point $p_d=(x_d,z_d)$ in the d-frame on the work implement; (e) measuring a Cartesian distance d between $p_h$ and $p_d$; and (f) measuring corresponding positions of motors used to drive the work implement.

The work implement can comprise a shovel handle and dipper assembly. The digging assembly can be attached to a hoist and crowd motor and the method further can comprise correlating the distance d with the measured position of the hoist motor, $d_{hm}$ and the crowd motor $d_{cm}$ for different distances d.

In accordance with a second aspect of the invention there is provided a system for allowing the calibration of a work implement location, the work implement being attached to a machine house, the system comprising:
(a) a component for defining an h-frame comprising a set of Cartesian coordinate axes fixed to the machine house with the (X, Z) plane being in the sagittal plane of the machine house and the Y-axis being orthogonal;
(b) a component for utilising a range measurement sensor at a point $p_h=(x_h,z_h)$ in the h-frame to create a directed line of measurement in the $(X_h,Z_h)$-plane of the h-frame originating at $p_h$ along which a range measurement is made, designated by angle $\theta_h$;
(c) a component for defining a d-frame comprising a set of Cartesian coordinate axes fixed to the work implement;
(d) a component for providing a range measurement sensor target at a point $p_d=(x_d,z_d)$ in the d-frame on the work implement;
(e) a component for measuring a Cartesian distance d between $p_h$ and $p_d$; and
(f) a component for measuring corresponding positions of motors used to drive the work implement.

In accordance with a third aspect of the invention there is provided a computer program product configured to perform a method described herein.

A computer program product is preferably stored on a computer usable medium, and adapted to provide calibration of a work implement location, the work implement being attached to a machine house, the computer program product comprising a computer readable program means for performing a method as described herein.

In accordance with a fourth aspect of the invention there is provided computer hardware including one or more processors configured to perform a method as described herein.

In accordance with a further aspect of the present invention, there is provided a method of calibrating the offsets of the hoist and crowd position measurement sensors for electric mining shovels using a range measurement sensor, substantially as herein described with reference to any one of the embodiments of the invention illustrated in the accompanying drawings and/or examples.

Preferred embodiments include improvements for determining offsets on the hoist and crowd motion position sensors using an independent range sensor that measures the distance between defined positions on the machine house and dipper-handle assembly.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

BRIEF DESCRIPTION OF THE DRAWINGS

Preferred forms of the present invention will now be described with reference to the accompanying drawings in which.

PREFERRED EMBODIMENT

Figure 1:
FIG. 1 illustrates an electric mining shovel loading a haul truck.

As shown in FIG. 1, a basic characteristic in the operation of a mining shovel, and other similar excavators, is that motion of the dipper in the sagittal plane of the machine is normally independent of swing motions about the swing axis of the excavator.

Figure 2:
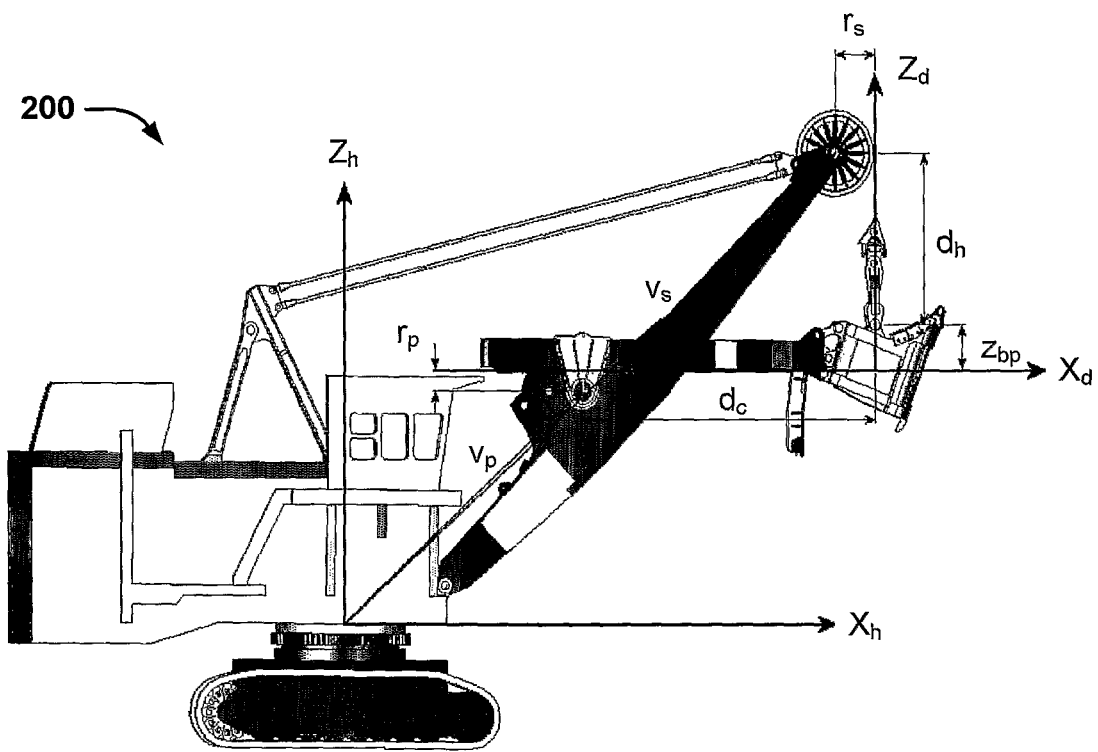
FIG. 2 illustrates the definitions of an h-frame and a d-frame within the sagittal plane of an electric mining shovel.
Figure 3:
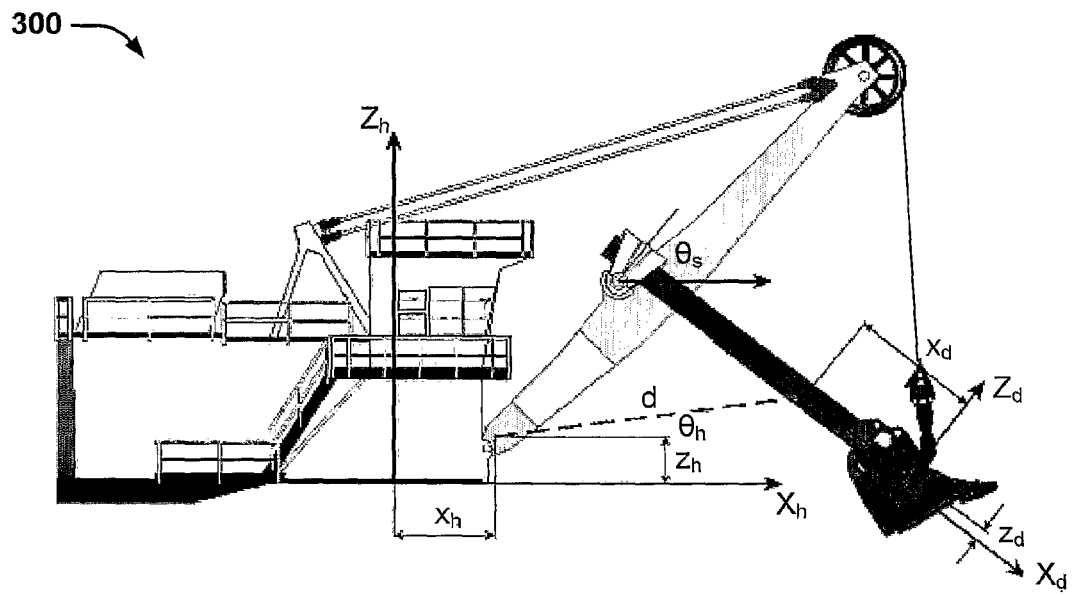
FIG. 3 illustrates a shovel configuration where an interframe range is measured between an optical range sensor on a machine house and a reflector on a digging assembly.

The definitions of geometry variables relevant to the discussion of the preferred embodiment are shown in FIG. 2 and FIG. 3.

The preferred embodiment is described in terms of the following:

The designation of a set of Cartesian coordinate axes fixed to the machine house with the (X, Z) plane being in the sagittal plane of the machine house and the Y-axis being orthogonal. The Cartesian frame defined by these axes is referred to as the h-frame.

An identified point $p_h=(x_h,z_h)$ in the h-frame that serves as the origin of the range measurement sensor.

A directed line in the $(X_h,Z_h)$-plane of the h-frame originating at $p_h$ along which a range measurement is made, designated by angle $\theta_h$; The line defined by these parameters is to be known as the line of measurement.

The designation of a set of Cartesian coordinate axes fixed to the shovel handle and dipper (digging) assembly. The Cartesian frame defined by these axes is to be known as the d-frame.

An identified point $p_d=(x_d,z_d)$ in the d-frame representing a "target" for the range measurement sensor.

The measured Cartesian distance d between $p_h$ and $p_d$.

The measured position of the hoist motor, $d_{hm}$ and the crowd motor $d_{cm}$.

An initial calibration procedure requires machine operators to manoeuvre the bucket so that the target passes across the line of measurement. In practice this amounts to either raising or lowering the dipper, preferably at low speed. The calibration system is required to record the range measurement d and the hoist and crowd motor measurements $d_{hm}$ and $d_{cm}$ when the target is in view.

The calibration offsets are computed in two stages. The objective of the first stage is to compute:

the true crowd extension $d_c$ and saddle angle $\theta_s$, which together define the position and orientation of the d-frame relative to the h-frame, and the true hoist extension $d_h$.

The motor positions $d_{hm}$ and $d_{cm}$ are related to the hoist and crowd extensions by transmission ratios governed by the specific mechanical design of the machine. The use of the adjective "true" here refers to the actual values of these quantities as opposed to the values that are obtained by multiplying the resolver values by the appropriate transmission ratios with incorrect offsets.

If the location of the range sensor origin relative to the house frame is $(x_h,z_h)$, and the range measurement and angular elevation are $(d, \theta_h)$, the position vector of the target in the house frame is:

$$v_t=(v_{tx},v_{tz})=(x_h+d\cos\theta_h, sz_h+d\sin\theta_h)$$

The normal distance from the saddle pivot to the x-axis of the d-frame is the radius of the saddle pinion, $r_p$. Defining the location of the centre of the saddle pinion relative to the h-frame origin by the vector $v_p=(v_{px}, v_{pz})$, the extension of the crowd actuator can be found from the target location using:

$$d_c = x_d + \sqrt{\|(v_t-v_p)\|-(r_p+z_d)^2}$$

The orientation of the d-frame with respect to the h-frame is given by $\theta_s$, which is calculated from the target location using:

$$\theta_s = \frac{\pi}{2} - \sin^{-1}\left(\frac{r_p+z_d}{\|v_t-v_p\|}\right) + \sin^{-1}\left(\frac{v_{tz}-v_{pz}}{\|v_t-v_p\|}\right)$$

This is valid for any reflector position where $v_{tx} \geq v_{px}$.

From the crowd extension and saddle angle, the position of the bail pin in the h-frame can be found as follows:

$$v_{bp}=v_p+(d_c\sin\theta_s+(r_p+z_{bp})\cos\theta_s, -d_c\cos\theta_s+(r_p+z_{bp})\sin\theta_s)$$

Defining the location of the centre of the sheaves by the vector $v_s=(v_{sx}, v_{sz})$, and the radius of the sheaves as $r_s$, the hoist extension $d_h$ can be calculated:

$$d_h=\sqrt{\|v_s-v_{bp}\|^2-r_s^2}$$

The objective at the second stage is to calculate the calibration offsets, $o_h$ and $o_c$, for each of the actuator position measurement sensors using the true extensions and measured motor positions, and correcting for rolling motion of the handle rack around the saddle pinion and the wrap of hoist cables over the sheaves.

The measured crowd motor position, reflected to the handle rack, is $d_{cm}$. The crowd resolver offset is found using:

$$o_c = d_c - d_{cm} - r_p\theta_s$$

The measured hoist motor position, reflected to the hoist rope, is $d_{hm}$. The hoist resolver offset is found using:

$$o_h = d_h - d_{hm} - r_s\left(\left(\cos^{-1}\left(\frac{v_{sx} - v_{bpx}}{\|v_s - v_{bp}\|}\right) - \sin^{-1}\left(\frac{r_s}{\|v_s - v_{bp}\|}\right)\right) - \frac{\pi}{2}\right)$$

The innovative feature of this calculation process can include the use of an independent range measurement sensor directed along a line to resolve the crowd and hoist offsets $o_c$ and $o_h$.

Figure 4:
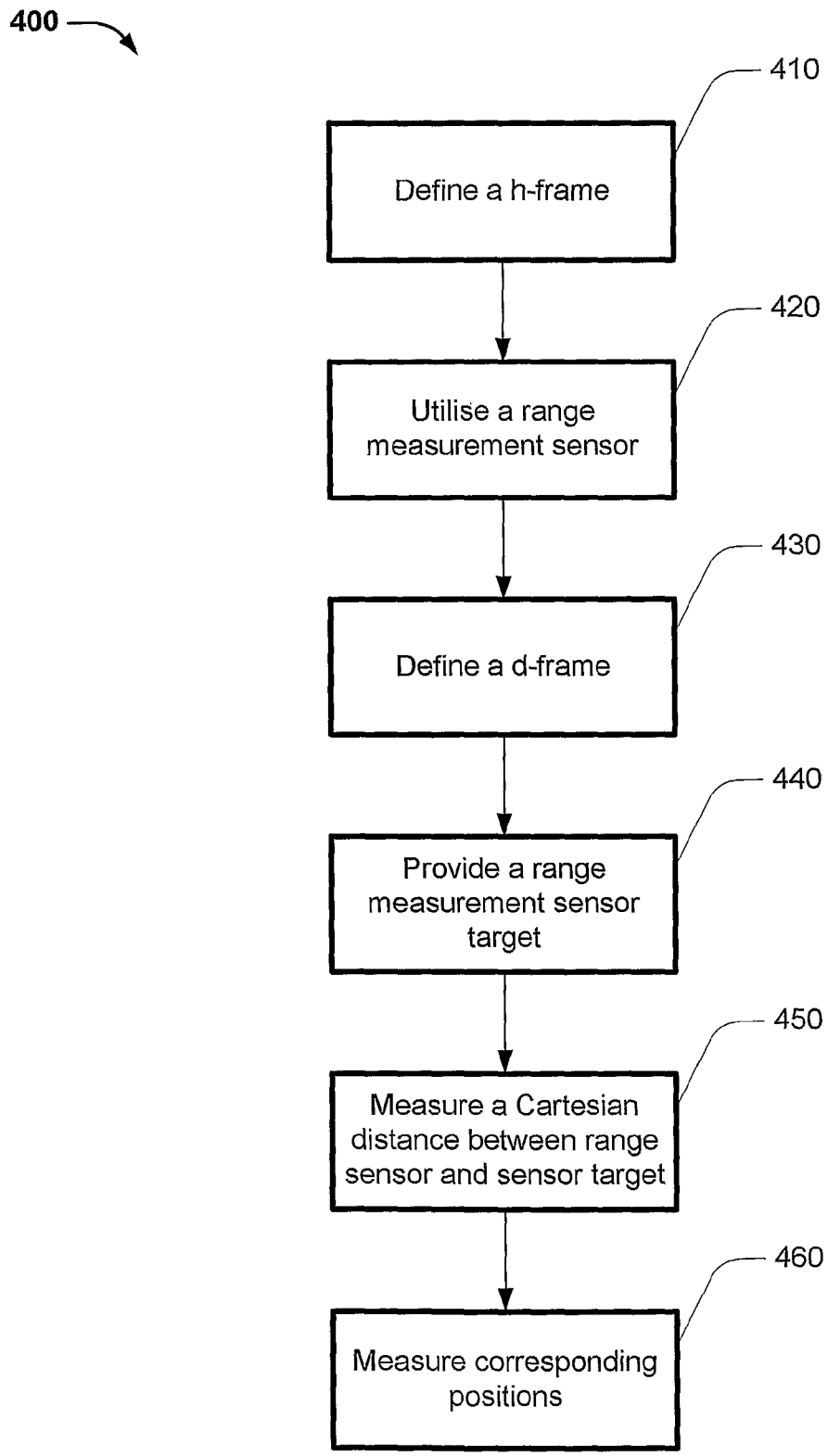
FIG. 4 shows an example flowchart of a method according to the present invention.

FIG. 4 illustrates a method 400 of calibrating a work implement location, the work implement being attached to a machine house. This method is described below.

Block 410 includes defining a h-frame comprising a set of Cartesian coordinate axes fixed to the machine house with the (X, Z) plane being in the sagittal plane of the machine house and the Y-axis being orthogonal Block 420 includes utilising a range measurement sensor at a point $p_h=(x_h,z_h)$ in the h-frame to create a directed line of measurement in the $(X_h,Z_h)$-plane of the h-frame originating at $p_h$ along which a range measurement is made, designated by angle $\theta_h$;

Block 430 includes defining a d-frame comprising a set of Cartesian coordinate axes fixed to the work implement;

Block 440 includes providing a range measurement sensor target at a point $p_d=(x_d,z_d)$ in the d-frame on the work implement;

Block 450 includes measuring a Cartesian distance d between $p_h$ and $p_d$; and Block 460 includes measuring corresponding positions of motors used to drive the work implement.

It will be appreciated that computer program product can be configured to perform a method as described herein.

A computer program product can be stored on a computer usable medium, the computer program product adapted to provide calibration of a work implement location, the work implement being attached to a machine house, the computer program product comprising a computer readable program means for performing a method as described herein.

It will also be appreciated that computer hardware including one or more processors can be configured to perform a method as described herein.

Figure 5:
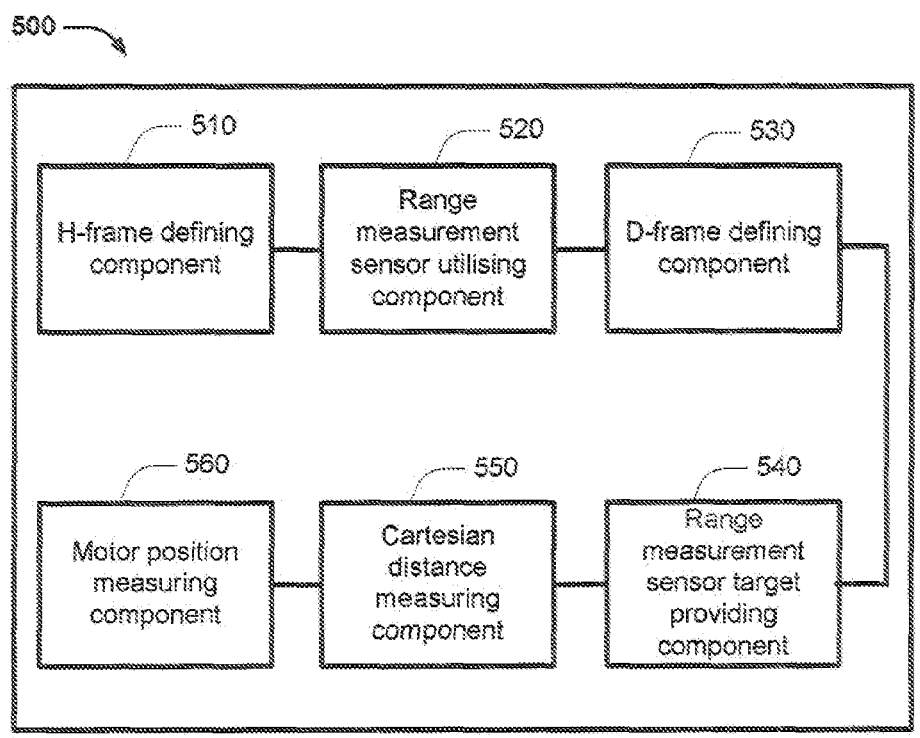
FIG. 5 shows an example schematic diagram of a system according to the present invention.

FIG. 5 illustrates a system 500 for allowing the calibration of a work implement location, the work implement being attached to a machine house, the system comprising:

(a) a component 510 for defining an h-frame comprising a set of Cartesian coordinate axes fixed to the machine house with the (X, Z) plane being in the sagittal plane of the machine house and the Y-axis being orthogonal;

(b) a component 520 for utilising a range measurement sensor at a point $p_h=(x_h,z_h)$ in the h-frame to create a directed line of measurement in the $(X_h,Z_h)$-plane of the h-frame originating at $p_h$ along which a range measurement is made, designated by angle $\theta_h$;

(c) a component 530 for defining a d-frame comprising a set of Cartesian coordinate axes fixed to the work implement;

(d) a component 540 for providing a range measurement sensor target at a point $p_d=(x_d,z_d)$ in the d-frame on the work implement;

(e) a component 550 for measuring a Cartesian distance d between $p_h$ and $p_d$; and (f) a component 560 for measuring corresponding positions of motors used to drive the work implement.

CONCLUSIONS AND INTERPRETATION

The described methodology facilitates the calibration of hoist and crowd position measurements associated with the digging assembly of electric mining shovels.

The methodology is suited to a machine-based implementation that could be easily and quickly performed by the machine operator.

Although the invention has been described with reference to specific examples it will be appreciated by those skilled in the art that the invention may be embodied in many other forms.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors.

The term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

One embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

However, it is understood that embodiments of the invention may be practiced without these specific details. In other instances, well-known methods, structures and techniques have not been shown in detail in order not to obscure an understanding of this description.

While there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of calibrating a work implement location, the work implement being attached to a machine house, the method comprising the steps of
    (a) defining a h-frame comprising a set of Cartesian coordinate axes fixed to the machine house with the (X, Z) plane being in the sagittal plane of the machine house and the Y-axis being orthogonal;
    (b) utilising a range measurement sensor at a point $p_h=(x_h, z_h)$ in the h-frame to create a directed line of measurement in the $(X_h, Z_h)$-plane of the h-frame originating at $p_h$ along which a range measurement is made, designated by angle $\theta_h$;
    (c) defining a d-frame comprising a set of Cartesian coordinate axes fixed to the work implement;
    (d) providing a range measurement sensor target at a point $p_d=(x_d, z_d)$ in the d-frame on the work implement;
    (e) measuring a Cartesian distance d between $p_h$ and $p_d$; and
    (f) measuring corresponding positions of motors used to drive the work implement.

2. A method as claimed in claim 1 wherein said work implement comprises a shovel handle and dipper assembly.

3. A method as claimed in claim 2 wherein the digging assembly is attached to a hoist and crowd motor and said method further comprises correlating the distance d with the measured position of the hoist motor, $d_{hm}$ and the crowd motor $d_{cm}$ for different distances d.

4. A method as claimed in claim 1 comprising the step of:
    (g) maneuvering the work implement so that the range measurement sensor target intersects the line of measurement,
    wherein step (g) occurs prior to step (e).

5. A method as claimed in claim 3 wherein the digging assembly includes a crowd actuator and a hoist actuator which are driven by the crowd motor and the hoist motor respectively, thereby to drive the work implement.

6. A method as claimed in claim 5 comprising the step of:
    (h) computing calibration offsets, $o_c$ and $o_h$, for the crowd and hoist actuators.

7. A method as claimed in claim 6, wherein step (h) comprises the steps of:
    (i) computing the extension of the crowd actuator $d_c$ and the saddle angle $\theta_x$, which together define the position and orientation of the d-frame relative to the h-frame; and
    (j) thereafter computing the extension of the hoist actuator $d_h$.

8. A method as claimed in claim 7, wherein step (h) comprises the further step of:
    (k) utilising the computed actuator extensions $d_c$ and $d_h$, and the measured motor positions $d_{hm}$ and $d_{cm}$ to calculate the calibration offsets $o_c$ and $o_h$.

9. A method as claimed in claim 8, comprising the step of utilising an independent range measurement sensor directed along a line to resolve the crowd and hoist offsets $o_c$ and $o_h$.

10. A system for allowing the calibration of a work implement location, the work implement being attached to a machine house, the system comprising:
    (a) a component for defining an h-frame comprising a set of Cartesian coordinate axes fixed to the machine house with the (X, Z) plane being in the sagittal plane of the machine house and the Y-axis being orthogonal;
    (b) a component for utilising a range measurement sensor at a point $p_h=(x_h, z_h)$ in the h-frame to create a directed line of measurement in the $(X_h, Z_h)$-plane of the h-frame originating at $p_h$ along which a range measurement is made, designated by angle $\theta_h$;
    a component for defining a d-frame comprising a set of Cartesian coordinate axes fixed to the work implement;
    (d) a component for providing a range measurement sensor target at point $p_d=(x_d, z_d)$ in the d-frame on the work implement;
    (e) a component for measuring a Cartesian distance between $p_h$ and $p_d$; and
    (f) a component for measuring corresponding positions of motors used to drive the work implement.

* * * * *